(12) United States Patent
Huang et al.

(10) Patent No.: US 7,924,369 B2
(45) Date of Patent: Apr. 12, 2011

(54) LIGHT GUIDE PLATE STRUCTURE AND BACK LIGHT MODULE

(75) Inventors: Yao-Der Huang, Jhudong Township, Hsinchu County (TW); Wei-Kuang Chu, Taipei (TW)

(73) Assignee: Transpacific Systems, LLC, Wilmington, DE (US)

( * ) Notice: Subject to any disclaimer, the term of this patent is extended or adjusted under 35 U.S.C. 154(b) by 972 days.

(21) Appl. No.: 11/512,812

(22) Filed: Aug. 30, 2006

(65) Prior Publication Data

US 2006/0291251 A1 Dec. 28, 2006

Related U.S. Application Data

(62) Division of application No. 10/605,920, filed on Nov. 6, 2003, now Pat. No. 7,443,462.

(30) Foreign Application Priority Data

Sep. 23, 2003 (TW) ............................... 92217035 U

(51) Int. Cl.
*G02F 1/1335* (2006.01)

(52) U.S. Cl. ......................................................... 349/65

(58) Field of Classification Search ................ None
See application file for complete search history.

(56) References Cited

U.S. PATENT DOCUMENTS

| | | | |
|---|---|---|---|
| 4,252,416 A | 2/1981 | Jaccard | |
| 5,050,946 A | 9/1991 | Hathaway et al. | |
| 5,202,950 A | 4/1993 | Arego et al. | |
| 5,737,044 A | 4/1998 | Van Haaren et al. | |
| 5,914,760 A | 6/1999 | Daiku | |
| 6,011,602 A | 1/2000 | Miyashita | |
| 6,147,725 A | 11/2000 | Yuuki et al. | |
| 6,206,535 B1 | 3/2001 | Hattori et al. | |
| 6,379,016 B1 | 4/2002 | Boyd et al. | |
| 6,454,452 B1 | 9/2002 | Sasagawa et al. | |
| 6,474,827 B2 | 11/2002 | Shinohara et al. | |
| 6,480,307 B1 | 11/2002 | Yang | |
| 6,644,823 B2 | 11/2003 | Egawa et al. | |
| 6,647,199 B1 | 11/2003 | Pelka et al. | |
| 6,755,460 B1 | 6/2004 | Marrs et al. | |
| 6,827,458 B2 | 12/2004 | Suga | |
| 6,846,098 B2 | 1/2005 | Bourdelais et al. | |
| 7,443,462 B2 * | 10/2008 | Huang et al. .................... | 349/65 |
| 2002/0003593 A1 | 1/2002 | Arakawa et al. | |
| 2003/0231483 A1 | 12/2003 | Higashiyama | |
| 2004/0125589 A1 | 7/2004 | Sung | |
| 2004/0252256 A1 | 12/2004 | Hsu et al. | |

OTHER PUBLICATIONS

Stolowitz Ford Cowger LLP; Related Case Listing; May 17, 2010; 1 Page.

* cited by examiner

*Primary Examiner* — Timothy Rude

(74) *Attorney, Agent, or Firm* — Stolowitz Ford Cowger LLP

(57) ABSTRACT

A structure of a light guide plate comprising a light guide plate and a plurality of transparent elements is disclosed. The light guide plate comprises at least one light incident surface, a light scattering surface and a light emitting surface. The light scattering surface has a plurality of notches and these transparent elements are disposed therein. The transparent elements refractive index is different from that of the light guide plate. By disposing these transparent elements, the light scattering surface can improve light scattering effect. In addition, a back light module comprising a linear light source and a light guide plate structure mentioned above is also disclosed. The linear light source is disposed next to the light incident surface of the light guide plate.

20 Claims, 1 Drawing Sheet

LIGHT GUIDE PLATE STRUCTURE AND BACK LIGHT MODULE

CROSS REFERENCE TO RELATED APPLICATIONS

The present application is a divisional of U.S. application Ser. No. 10/605,920, filed Nov. 6, 2003. The entire disclosure of U.S. application Ser. No. 10/605,920 is considered as being part of the disclosure of the present application and is hereby incorporated by reference herein in its entirety.

BACKGROUND OF INVENTION

1. Field of the Invention

The present invention relates to a light guide plate structure and a back light module, and more particularly to a light guide plate structure for improving scattering effects on a light scattering surface and a back light module applied therefrom.

2. Description of the Related Art

For the trend of small sizes of electronic products, the development of electronic devices is toward high density and integrity in small size electronic products. Because a variety of functions embodied within electronic products with small sizes, a large number of portable devices have been popularly used and replaced the big sized electronic products. Therefore, they have become the main stream in consumer market. These portable devices includes, such as notebooks, cell phones, electronic dictionaries, personal digital assistants, web pads, tablet PC and portable games.

For the application of small size electronic products, liquid crystal displays (LCD) with high efficiency of space, high quality, low power consumption and low or no radiation have been popularly used. LCD is composed of a liquid crystal panel and a back light module. Because liquid crystal within the panel does not illuminate itself, the back light modules must provide a plate light source for the panel. Then, LCD serves the function of display. Therefore, back light modules are very important in displays.

FIG. 1 is a cross-sectional schematic drawing showing a prior art back light module. Referring to FIG. 1, the back light module 100 includes a light guide plate 110, a liner light source 120 and a reflective cover 130. The light guide plate 110 is, for example, a plate-type light guide plate, which comprises at least one light incident surface 112, a light scattering surface 114 and a light emitting surface 116. The light incident surface 112 is on a sidewall of the light guide plate 110, the light scattering surface 114 is on a bottom surface of the light guide plate 110 and the light emitting surface 116 is on a top surface of the light guide plate 110.

The liner light source 120 is, for example, a cold cathode florescent lamp, which is disposed next to the light incident surface 112 of the light guide plate 110, wherein light from the liner light source 120 transmits through the light incident surface 112 and enters into the light guide plate 110, and the light scattering surface 114 passes the light to the light emitting surfaces 116 and out thereof.

Additionally, the reflective cover 130 is disposed next to the light incident surface 112 of the light guide plate 110 and covers the liner light source 120 for reflecting light from the liner light source 120 to the light incident surface 112 of the light guide plate 110.

Referring to FIG. 1, the light scattering surface 114 of the light guide plate 110 provides a enough scattering area. Therefore, light from the liner light source 120 after being scattered on the light scattering surface 114 can uniformly travel to the light emitting surface 116, and the light exiting form the light emitting surface 116 transforms into a plate light source. It should be noted that a plurality of transparent bumps 140 are disposed on the light scattering surface 114 as scattering spots thereof in prior art. The transparent bumps 140, however, are made of the same material of the light guide plate 110 and have the same refractive index as the light guide plate 110. Therefore, the scattering effect on the light scattering surface is limited.

FIG. 2 is a cross-sectional schematic drawing showing a prior art back light module. Referring to FIG. 2, a back light module 100' has the same structure as the back light module 100 described in FIG. 1. The same descriptions will not be repeated herein. The difference between these two back light modules is that a plurality of holes 150 are formed on the light scattering surface 114' serving as scattering spots thereon. However, in the prior art back light module light still transports in the same material. Therefore, the scattering effect on the light scattering surface 114' is limited.

From the descriptions mentioned, the prior art back light module by forming either transparent bumps or holes on the light scattering surface of the light guide plate cannot provide excellent scattering effect and a uniform plate light source because of back scattering effects thereon.

SUMMARY OF INVENTION

In an embodiment of the present invention, a of a light guide plate structure, having a plurality of notches on a light scattering surface and disposing a plurality of transparent elements therein, is provided to improve the scattering effect thereof, wherein the refractive index of the plurality of transparent elements is different form that of the plurality of the light guide plate.

In an embodiment of the present invention, a back light module is provided to generate a better scattering effect on a scattering light surface and a plurality of notches are formed on the light scattering surface of the light guide plate and a plurality of transparent elements are disposed therein to provide a more uniform plate light source, wherein the refractive index of the plurality of transparent is different form that of the plurality of the light guide plate.

Accordingly, the present invention provides a light guide plate structure applied to a back light module and adapted to transform a liner light source into a plate light source. The guide light source structure comprises a light guide plate and a plurality of transparent elements. The light guide plate comprises at least one light incident surface, light scattering surface and a light emitting surface. The light incident surface is on a sidewall of the light guide plate, the light scattering surface is on a bottom surface of the light guide plate and the light emitting surface is on a top surface of the light guide plate, wherein the light scattering surface has a plurality of notches. The plurality of transparent elements are disposed within the plurality of notches and a reflective index of the plurality of transparent elements is different from that of the light guide plate.

The present invention provides a back light module adapted to provide a plate light source. The back light module comprises a light guide plate structure and a liner light source. The guide light source structure comprises a light guide plate and a plurality of transparent elements. The light guide plate comprises at least one light incident surface, light scattering surface and a light emitting surface. The light incident surface is on a sidewall of the light guide plate, the light scattering surface is on a bottom surface of the light guide plate and the light emitting surface is on a top surface of the light guide plate, wherein the light scattering surface has a plurality of notches. The plurality of transparent elements is disposed within the plurality of notches and a reflective index of the plurality of transparent elements is different from that of the light guide plate. The liner light source is next to the light incident surface of the light guide plate, wherein light from the liner light source transports the light incident surface and enters into the light guide plate, and the light scattering surface passes the light to the light emitting surfaces and out thereof.

In preferred embodiments of the present invention, these transparent elements are made of transparent material, such as glass or acrylic. In addition, the light guide plate is a plate-type light guide plate or a mesa light guide plate. When the light plate is a mesa light guide plate, the plurality of transparent elements have different sizes, the plurality of transparent elements are disposed on the light scattering surface in sequence by the size thereof, and bottom surfaces of the plurality of transparent elements are substantially on a same surface. Therefore, the mesa light guide plate can be firmly disposed on a plastic frame. Moreover, the liner light source is, for example, a cold cathode florescent lamp.

In preferred embodiments of the present invention, the back light module further comprises a reflective cover, which is disposed next to the light incident surface of the light guide plate and covers the liner light source for reflecting light from the liner light source to the light incident surface of the light guide plate. In order to improve luminance of the back light module, a diffusion sheet and a brightness enhancement film can be applied thereto. In the embodiment, the diffusion sheet can be disposed, for example, on the light emitting surface of the light guide plate, and the brightness enhancement film can be disposed on the diffusion sheet.

In the present invention, the plurality of notches are formed on the light scattering surface of the light guide plate and the plurality of transparent elements are disposed within the notches. In addition, the refractive index of these transparent elements is different from that of the light guide plate. When light comes into and goes out these transparent elements through the light guide plate, a better scattering effect is achieved and the back light module of the present invention provides a more uniform plate light source because of the refractive index difference between these transparent elements and the light guide plate.

In order to make the aforementioned and other objects, features and advantages of the present invention understandable, a preferred embodiment accompanied with figures is described in detail below.

DETAILED DESCRIPTION

Figure 1:
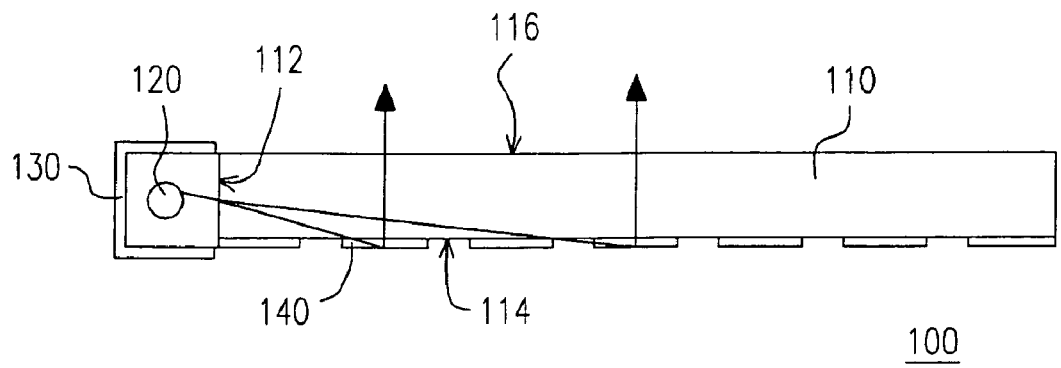
FIG. 1 is a cross-sectional schematic drawing showing a prior art back light module.
Figure 2:
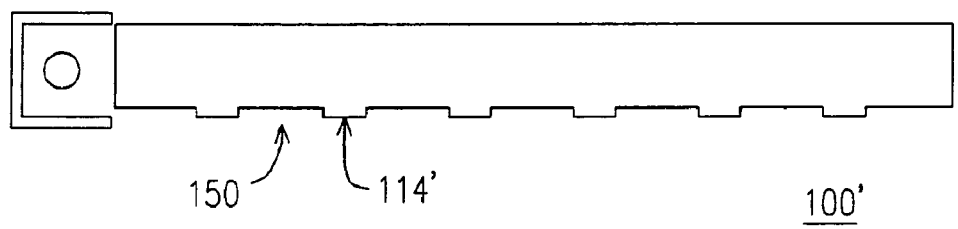
FIG. 2 is a cross-sectional schematic drawing showing a prior art back light module.
Figure 3:
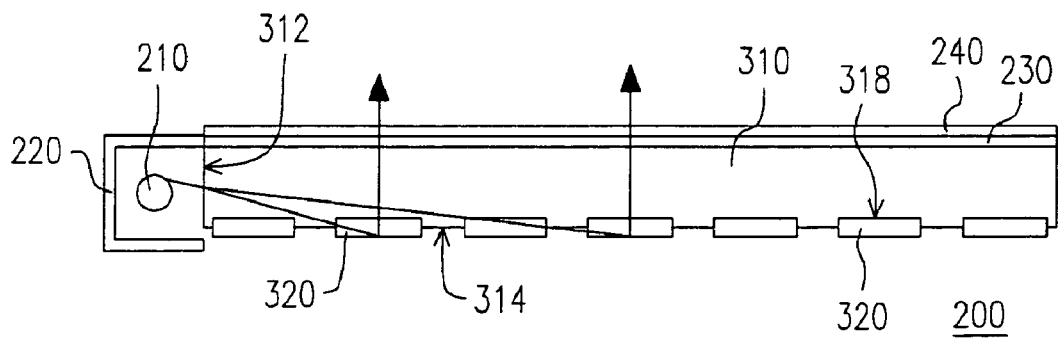
FIG. 3 is a cross-sectional schematic drawing showing a first preferred back light module in accordance with the present invention.

FIG. 3 is a cross-sectional schematic drawing showing a first preferred back light module in accordance with the present invention. Please referring to FIG. 3, the back light module 200 comprises a light guide plate structure 300 and a liner light source 210. The light guide plate structure 300 is composed of a light guide plate 310 and a plurality of transparent elements 312. The light guide plate 310 is, for example, a plate-type light guide plate, which comprises at least one light incident surface 312, light scattering surface 314 and light emitting surface 316. The light incident surface 312 is on a sidewall of the light guide plate 310, the light scattering surface 314 is on a bottom surface of the light guide plate 310 and the light emitting surface 316 is on a top surface of the light guide plate 310, wherein the light scattering surface 314 has a plurality of notches 318.

The plurality of transparent elements 320 are made of transparent material, such as glass or acrylic, which are separately disposed within the plurality of notches 318 as scattering spots of the light scattering surface 314. Moreover, a reflective index of the plurality of transparent elements 320 is different from that of the light guide plate 310.

The liner light source 210 is, for example, a cold cathode florescent lamp, which is disposed next to the light incident surface 312 of the light guide plate 310, wherein light from the liner light source 210 transmits through the light incident surface 312 and enters into the light guide plate 310, and the light scattering surface 314 passes the light to the light emitting surfaces 316 and out thereof.

In addition, the back light module 200 further comprises a reflective cover 220, which is disposed next to the light incident surface 312 of the light guide plate 310 and covers the liner light source 210 for reflecting light from the liner light source to the light incident surface 312 of the light guide plate 310. In order to improve luminance of the back light module 200, a diffusion sheet 230 and a brightness enhancement film 240 can be applied thereto. In the embodiment, the diffusion sheet 230 can be disposed, for example, on the light emitting surface 316 of the light guide plate 310, and the brightness enhancement film 240 can be disposed on the diffusion sheet 230.

It is to be noted that the plurality of notches 318 are formed on the light scattering surface 314 of the light guide plate 310 and the plurality of transparent elements 320 are disposed within the notches 318. In addition, the refractive index of these transparent elements 320 is different that of the light guide plate 310. When light comes into and goes out these transparent elements 320 through the light guide plate 310, a better scattering effect is achieved and the back light module 200 of the present invention provides a more uniform plate light source because of the refractive index difference between these transparent elements 320 and the light guide plate 310.

Figure 4:
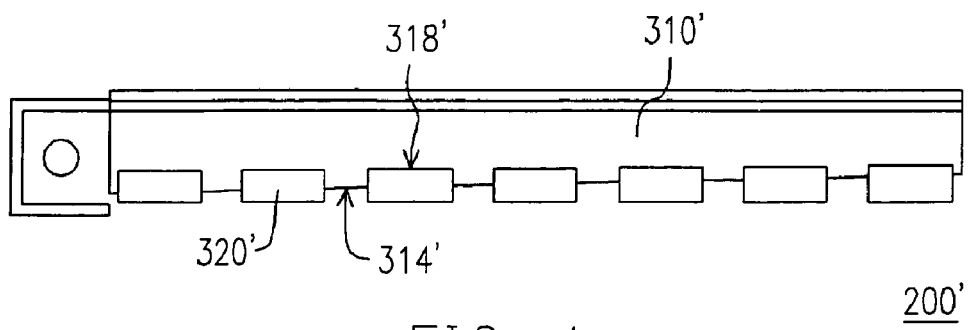
FIG. 4 is a cross-sectional schematic drawing showing a second preferred back light module in accordance with the present invention.

FIG. 4 is a cross-sectional schematic drawing showing a second preferred back light module in accordance with the present invention. A back light module 200' has the same structure as the back light module 200 described in the first preferred embodiment. The same descriptions will not be repeated. The difference between the first and the second embodiments is that the light guide plate 310' is, for example, a mesa light guide plate. The plurality of transparent elements 320' have different sizes, the plurality of transparent elements 320' are disposed into the notches 318' on the light scattering surface 314' in sequence by the size thereof, and bottom surfaces of the plurality of transparent elements 320' are substantially on a same surface. Therefore, the mesa light guide plate can be firmly disposed on a plastic frame (not shown) for improving the convenience of assembling the back light module.

From the descriptions mentioned above, in the present invention the plurality of notches are formed on the light scattering surface of the light guide plate and the plurality of transparent elements are disposed within the notches for serving as scattering spots on the light scattering surface. In addition, the refractive index of these transparent elements is different that of the light guide plate. When light comes into and goes out these transparent elements through the light guide plate, a better scattering effect is achieved and the back light module of the present invention provides a more uniform plate light source because of the refractive index difference between these transparent elements and the light guide plate.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

The invention claimed is:

1. A back light device, comprising:
   a light guide plate comprising a first solid material and including a light scattering surface and a light emitting surface, wherein the light scattering surface has a plurality of notches formed therein; and
   transparent element structures comprising a second solid material which is different than the first solid material, wherein each of the transparent element structures are partially disposed into a corresponding one of the plurality of notches and have solid side walls that extend outside of the light guide plate, and wherein the transparent element structures are configured to receive light from the light guide plate and reflect the light to the light emitting surface of the light guide plate with a bottom surface of the transparent element structures.

2. The back light device of claim 1, wherein the transparent element structures are block-shaped.

3. The back light device of claim 2, wherein at least three of the transparent element structures have different sized block shapes and are positioned at least partially within the notches in sequence by size.

4. The back light device of claim 1, wherein the transparent element structures comprise a glass material or an acrylic material.

5. The back light device of claim 1, further comprising a brightness enhancement film positioned adjacent to a top surface of the light guide plate, wherein the brightness enhancement film is configured to modify a luminance of the light guide plate.

6. The back light device of claim 1, further comprising a diffusion sheet positioned adjacent to a top surface of the light guide plate, wherein the diffusion sheet is configured to modify a luminance of the light guide plate.

7. The back light device of claim 1, further comprising a linear light source positioned adjacent to at least one light incident surface of the light guide plate.

8. A back light device, comprising:
   a light guide plate including at least one light incident surface, a light scattering surface comprising a first solid material, and a light emitting surface, wherein the light incident surface is on a sidewall of the light guide plate, the light scattering surface is on a bottom surface of the light guide plate, and the light emitting surface is on a top surface of the light guide plate, and wherein the light scattering surface has notches formed therein; and
   means for scattering light through the notches at a refractive index different from that of the light guide plate, wherein the means for scattering comprises a second solid material which is different than the first solid material, wherein the means for scattering are partially disposed into the notches and have solid side walls that extend outside of the light guide plate, and wherein the means for scattering is configured to receive light from the light guide plate and reflect the light to the light emitting surface of the light guide plate with a bottom surface of the means for scattering.

9. The back light device of claim 8, wherein the transparent element structures are block-shaped.

10. The back light device of claim 8, wherein the means for scattering have rectangular profiles.

11. The back light device of claim 8, further comprising a brightness enhancement film positioned adjacent to a top surface of the light guide plate, wherein the brightness enhancement film is configured to modify a luminance of the light guide plate.

12. The back light device of claim 8, further comprising a diffusion sheet positioned adjacent to a top surface of the light guide plate, wherein the diffusion sheet is configured to modify a luminance of the light guide plate.

13. The back light device of claim 8, further comprising a linear light source positioned adjacent to the at least one light incident surface of the light guide plate.

14. The back light device of claim 8, wherein the means for scattering includes solid side walls that continuously extend between a first surface and a second surface, and wherein at least one of the first surface or the second surface is spaced apart from the light guide plate.

15. A back light device, comprising:
   a light guide plate including a light incident surface, a light scattering surface, and a light emitting surface comprising a first solid material, wherein the light incident surface is on a sidewall of the light guide plate, the light scattering surface is on a bottom surface of the light guide plate, and the light emitting surface is on a top surface of the light guide plate, and wherein the light scattering surface has notches formed therein;
   transparent element structures that are block-shaped and comprising a second solid material which is different than the first solid material, wherein each of the transparent element structures are positioned at least partially within a corresponding one of the notches, and wherein a reflective index of the transparent element structures is different from a reflective index of the light guide plate;
   a brightness enhancement film positioned adjacent to the top surface of the light guide plate;
   a diffusion sheet positioned adjacent to the top surface of the light guide plate; and
   a linear light source positioned adjacent to the light incident surface.

16. The back light device of claim 15, wherein the transparent element structures have solid parallel side surfaces that extend between solid parallel top and bottom surfaces.

17. The back light device of claim 15, wherein the transparent element structures have a substantially rectangular profile.

18. The back light device of claim 15, wherein at least three of the transparent element structures have different sizes and are positioned at least partially within notches in the light guide plate in sequence by size, and wherein bottom surfaces of the at least three transparent pieces are substantially coplanar.

19. The back light device of claim 15, wherein the transparent element structures comprise a glass material or an acrylic material.

20. The back light device of claim 15, wherein the transparent element structures have solid side walls that continuously extend between a first surface and a second surface, and wherein at least one of the first surface or the second surface is spaced apart from the light guide plate.

* * * * *

UNITED STATES PATENT AND TRADEMARK OFFICE
CERTIFICATE OF CORRECTION

PATENT NO. : 7,924,369 B2  Page 1 of 1
APPLICATION NO. : 11/512812
DATED : April 12, 2011
INVENTOR(S) : Huang et al.

It is certified that error appears in the above-identified patent and that said Letters Patent is hereby corrected as shown below:

Title page, item (22), under "Filed", in Column 1, Line 1, delete "Aug. 30, 2006" and insert -- Aug. 29, 2006 --.

Signed and Sealed this
Thirteenth Day of September, 2011

David J. Kappos
*Director of the United States Patent and Trademark Office*